United States Patent
Wilson

(10) Patent No.: US 9,223,346 B2
(45) Date of Patent: Dec. 29, 2015

(54) MOBILE DEVICE CASE

(71) Applicant: Wimo Labs LLC, Chicago, IL (US)

(72) Inventor: Scott H. Wilson, Chicago, IL (US)

(73) Assignee: Wimo Labs LLC, Chicago, IL (US)

( * ) Notice: Subject to any disclaimer, the term of this patent is extended or adjusted under 35 U.S.C. 154(b) by 0 days.

(21) Appl. No.: 14/470,798

(22) Filed: Aug. 27, 2014

(65) Prior Publication Data

US 2015/0061477 A1    Mar. 5, 2015

Related U.S. Application Data

(60) Provisional application No. 61/870,335, filed on Aug. 27, 2013.

(51) Int. Cl.
*B65D 85/00* (2006.01)
*G06F 1/16* (2006.01)
*H04B 1/3888* (2015.01)

(52) U.S. Cl.
CPC ............ *G06F 1/1633* (2013.01); *G06F 1/1626* (2013.01); *H04B 1/3888* (2013.01)

(58) Field of Classification Search
CPC .............................. G06F 1/1628; A45C 11/22
USPC .......................... 206/320, 576, 724, 701, 811; 455/575.1, 575.8
See application file for complete search history.

(56) References Cited

U.S. PATENT DOCUMENTS

| | | | |
|---|---|---|---|
| 6,068,119 A | 5/2000 | Derr et al. | |
| 6,094,785 A | 8/2000 | Montgomery et al. | |
| 6,317,313 B1 | 11/2001 | Mosgrove et al. | |
| 6,415,138 B2 | 7/2002 | Sirola et al. | |
| 6,525,928 B1 | 2/2003 | Madsen et al. | |
| 6,536,589 B2 | 3/2003 | Chang | |
| 6,646,864 B2 | 11/2003 | Richardson | |
| 6,659,274 B2 | 12/2003 | Enners | |
| 6,995,976 B2 | 2/2006 | Richardson | |
| 7,158,376 B2 | 1/2007 | Richardson et al. | |
| 7,180,735 B2 | 2/2007 | Thomas et al. | |

(Continued)

FOREIGN PATENT DOCUMENTS

| EP | 0527712 A1 | 2/1993 |
|---|---|---|
| KR | 200421862 | 7/2006 |

OTHER PUBLICATIONS

International Search Report for PCT Published Application No. WO2013188342, dated Sep. 24, 2013, 2 pages.

*Primary Examiner* — Luan K Bui
*Assistant Examiner* — Rafael Ortiz
(74) *Attorney, Agent, or Firm* — Neal, Gerber & Eisenberg LLP

(57) ABSTRACT

A protective case for housing a mobile device is provided. The protective case includes an upper assembly and a bottom assembly attachable to (and separable from) the upper assembly to form a watertight inner cavity therebetween. The resulting profile (i.e., external shape) of the protective case mirrors that of the mobile device installed therein. More particularly, the protective case generally includes a top surface, a bottom surface, and spaced-apart inner and outer perimeters extending between the top and bottom surfaces. The top surface of the case is made up of or includes the top surfaces of various other components of the case, and those component top surfaces are flush with one another such that the top surface of the case is completely flat (i.e., does not include an obtrusive raised protective rim).

15 Claims, 13 Drawing Sheets

(56) References Cited

U.S. PATENT DOCUMENTS

| | | |
|---|---|---|
| 7,230,823 B2 | 6/2007 | Richardson et al. |
| 7,312,984 B2 | 12/2007 | Richardson et al. |
| 7,449,650 B2 | 11/2008 | Richardson et al. |
| D600,908 S | 9/2009 | Richardson et al. |
| 7,594,576 B2 * | 9/2009 | Chen et al. ............ 206/320 |
| 7,609,512 B2 | 10/2009 | Richardson et al. |
| 7,612,997 B1 | 11/2009 | Diebel et al. |
| 7,663,879 B2 | 2/2010 | Richardson et al. |
| 7,688,580 B2 | 3/2010 | Richardson et al. |
| D615,536 S | 5/2010 | Richardson et al. |
| D616,360 S | 5/2010 | Huang |
| D616,361 S | 5/2010 | Huang |
| D617,784 S | 6/2010 | Richardson et al. |
| D617,785 S | 6/2010 | Richardson et al. |
| 7,782,610 B2 | 8/2010 | Diebel et al. |
| 7,889,489 B2 | 2/2011 | Richardson et al. |
| 7,889,498 B2 | 2/2011 | Diebel et al. |
| D634,741 S | 3/2011 | Richardson et al. |
| 7,907,394 B2 | 3/2011 | Richardson et al. |
| D636,386 S | 4/2011 | Richardson et al. |
| 7,933,122 B2 | 4/2011 | Richardson et al. |
| 7,957,524 B2 | 6/2011 | Chipping |
| 8,073,131 B2 | 12/2011 | Bodkin et al. |
| D653,202 S | 1/2012 | Hasbrook et al. |
| D659,094 S | 5/2012 | Brand et al. |
| 8,204,561 B2 | 6/2012 | Mongan et al. |
| D669,458 S | 10/2012 | Wilson et al. |
| 8,286,789 B2 | 10/2012 | Wilson et al. |
| 8,312,991 B2 | 11/2012 | Diebel et al. |
| 8,328,008 B2 | 12/2012 | Diebel et al. |
| D675,161 S | 1/2013 | Rayner |
| 8,342,325 B2 | 1/2013 | Rayner |
| 8,367,235 B2 | 2/2013 | Huang |
| 8,393,466 B2 | 3/2013 | Rayner |
| 8,395,894 B2 | 3/2013 | Richardson et al. |
| 8,442,604 B1 | 5/2013 | Diebel |
| 8,457,701 B2 | 6/2013 | Diebel |
| D685,327 S | 7/2013 | Rayner |
| 8,479,875 B2 | 7/2013 | Richardson et al. |
| 8,483,758 B2 | 7/2013 | Huang |
| 8,503,170 B1 * | 8/2013 | Hsu et al. ............ 361/679.02 |
| 8,505,718 B2 | 8/2013 | Griffin, Jr. et al. |
| 8,509,864 B1 | 8/2013 | Diebel |
| 8,526,180 B2 | 9/2013 | Rayner |
| 8,531,833 B2 | 9/2013 | Diebel et al. |
| 8,531,834 B2 | 9/2013 | Rayner |
| 8,548,541 B2 | 10/2013 | Rayner |
| 8,564,950 B2 | 10/2013 | Rayner |
| 8,567,599 B2 | 10/2013 | Beatty et al. |
| 8,570,737 B2 | 10/2013 | Rayner |
| 8,623,494 B2 | 1/2014 | Richardson et al. |
| 8,640,868 B2 * | 2/2014 | O'Dowd et al. ............ 206/320 |
| 8,695,798 B2 * | 4/2014 | Simmer ............ 206/320 |
| 8,714,347 B2 | 5/2014 | Mongan et al. |
| 8,915,361 B2 * | 12/2014 | Rayner ............ 206/320 |
| 2005/0168638 A1 | 8/2005 | Iwata |
| 2007/0158220 A1 * | 7/2007 | Cleereman et al. ............ 206/320 |
| 2010/0147737 A1 | 6/2010 | Richardson et al. |
| 2011/0073608 A1 | 3/2011 | Richardson et al. |
| 2011/0159324 A1 | 6/2011 | Huang et al. |
| 2011/0228458 A1 | 9/2011 | Richardson et al. |
| 2011/0228459 A1 | 9/2011 | Richardson et al. |
| 2011/0287726 A1 | 11/2011 | Huang |
| 2011/0297578 A1 | 12/2011 | Stiehl |
| 2012/0018323 A1 | 1/2012 | Johnson et al. |
| 2012/0019920 A1 | 1/2012 | Mongan et al. |
| 2012/0043236 A1 * | 2/2012 | Szucs et al. ............ 206/320 |
| 2012/0118773 A1 * | 5/2012 | Rayner ............ 206/320 |
| 2012/0320020 A1 | 12/2012 | Chiba |
| 2013/0043777 A1 | 2/2013 | Rayner |
| 2013/0092576 A1 | 4/2013 | Rayner |
| 2013/0126531 A1 | 5/2013 | Hynecek et al. |
| 2013/0146491 A1 * | 6/2013 | Ghali et al. ............ 206/320 |
| 2013/0181584 A1 | 7/2013 | Whitten et al. |
| 2013/0294020 A1 | 11/2013 | Rayner et al. |
| 2014/0028243 A1 | 1/2014 | Rayner |
| 2014/0045561 A1 * | 2/2014 | Liu ............ 455/575.8 |
| 2014/0049060 A1 | 2/2014 | Rayner |
| 2014/0049142 A1 | 2/2014 | Magness |
| 2014/0076747 A1 | 3/2014 | Mongan et al. |
| 2014/0092536 A1 | 4/2014 | Dukerschein et al. |
| 2014/0097102 A1 | 4/2014 | Piatt et al. |

* cited by examiner

MOBILE DEVICE CASE

PRIORITY CLAIM

This application claims priority to and the benefit of U.S. Provisional Patent Application No. 61/870,335, filed on Aug. 27, 2013, the entire contents of which are incorporated herein by reference.

TECHNICAL FIELD

Generally, this application relates to cases for portable electronic devices and, more particularly, to cases that may be used to protect a portable electronic device (or, more simply, a "device"). As used herein, the term "portable electronic device" may include any type of wireless communication device, such as, e.g., a mobile telephone, a tablet, a portable computer, a gaming device, a media player, a smart phone, a personal organizer, and the like. Though the primary embodiment discussed herein relates to a case for a smart phone, it will be understood that the principles of the invention could be adapted to other geometries for use with other portable electronic devices.

BACKGROUND

The market for phone cases has continued to grow with the prevalence of high-priced, fragile smart phones. However, most cases are either flimsy, cheap, and offer little or no protection, or they are large, bulky, and mask the aesthetics of the mobile device they are designed to protect. An example of the latter type of case is shown in U.S. Pat. No. 6,646,864 to Richardson. Some of these bulkier cases are designed to be watertight or water resistant up to a certain depth. However, in order to seal the phone or mobile device, they must completely seal it—often significantly increasing the size of the case.

Another feature common among prior art phone cases is a raised protective lip or rim around the periphery of the device face. In other words, the case extends out beyond the face of the device (and any cover over the device face), such as shown in FIG. 1 of Richardson. This "protective rim" serves to protect the face of the device (often glass) from impact should it be dropped. One of the most common failure modes for smart phones and the like is a drop, in which case the glass fascia of the device may crack or shatter. The extended rim is designed to absorb the majority of the impact and protect the screen of the device from damage. Obviously, the larger the rim and the further it extends outward from the device, the more protection it offers. However, the rim obstructs the view of the screen at angles, increases the outside package of the case+device combination, and is generally unappealing.

Another method to protect the device face that is necessary in watertight case models is to cover the face of the device with a generally transparent membrane. This membrane may be a second glass covering or a clear plastic of sufficient thickness to help absorb impacts. The membrane is sealed to the protective rim in some fashion, creating an airtight and watertight cover around the device. In the prior art, the membrane may be held in place through a compression fit, where top and bottom clam shells come together from opposite sides of the membrane. For example, U.S. Pat. No. 8,342,325 to Raynor. In other cases, the membrane may slide into, or otherwise be fixed to the upper clam shell. However, in all cases having such a membrane, a raised protective rim or other feature of the case extends up above the surface of the membrane in order to help retain it and seal it. For example, Raynor provides an example of a much less obtrusive rim, such as in FIG. 1B, but it is still present.

SUMMARY OF THE INVENTION

The present invention makes novel improvements over the prior art by creating a watertight or water resistant device case with a protective membrane, but no protective rim. This results in a design with a completely flush top face/surface. The design allows the case to mirror the aesthetic outer shape of the phone it is designed to protect, essentially looking like there is no case there at all, while providing robust, watertight protection. There is no tactile bump along the edge of the device case, but rather just a smooth transition to the side of the phone.

In certain embodiments, the present invention comprises a case backing formed in a shape to receive a particular mobile device. The edges of the backing are formed such that they curl upward around the mobile device when it is inserted therein. The curled upward edges present an upward-facing shelf to which is mounted a first bezel. The invention also comprises a transparent membrane of a dimension sufficient to completely cover the upper surface of the mobile device. An upper bezel is fixed to the perimeter of the membrane in a fashion such that it does not extend up above an upper surface of the membrane. The upper bezel may be mated to the lower bezel, and held in place, at least partially, by an outer edge of the backing. When assembled, the outer edge of the backing is flush with the upper bezel and the upper surface of the membrane, forming a watertight seal around the mobile device.

In other embodiments, the present invention comprises a case including an upper assembly and a bottom assembly attachable to (and separable from) the upper assembly to form a watertight inner cavity therebetween. The resulting profile (i.e., external shape) of the case mirrors that of the mobile device installed therein. More particularly, the case generally includes a top surface, a bottom surface, and spaced-apart inner and outer perimeters extending between the top and bottom surfaces. The top surface of the case is made up of or includes the top surfaces of various other components of the case, and those component top surfaces are flush with one another such that the top surface of the case is completely flat (i.e., does not include an obtrusive raised protective rim).

Other embodiments and aspects will be clear from a review of the following detailed description and figures.

BRIEF DESCRIPTION OF THE DRAWINGS

FIGS. 5A and 5B are close-up isometric section views of certain aspects of certain components illustrated in FIG. 5.

Figure 1:
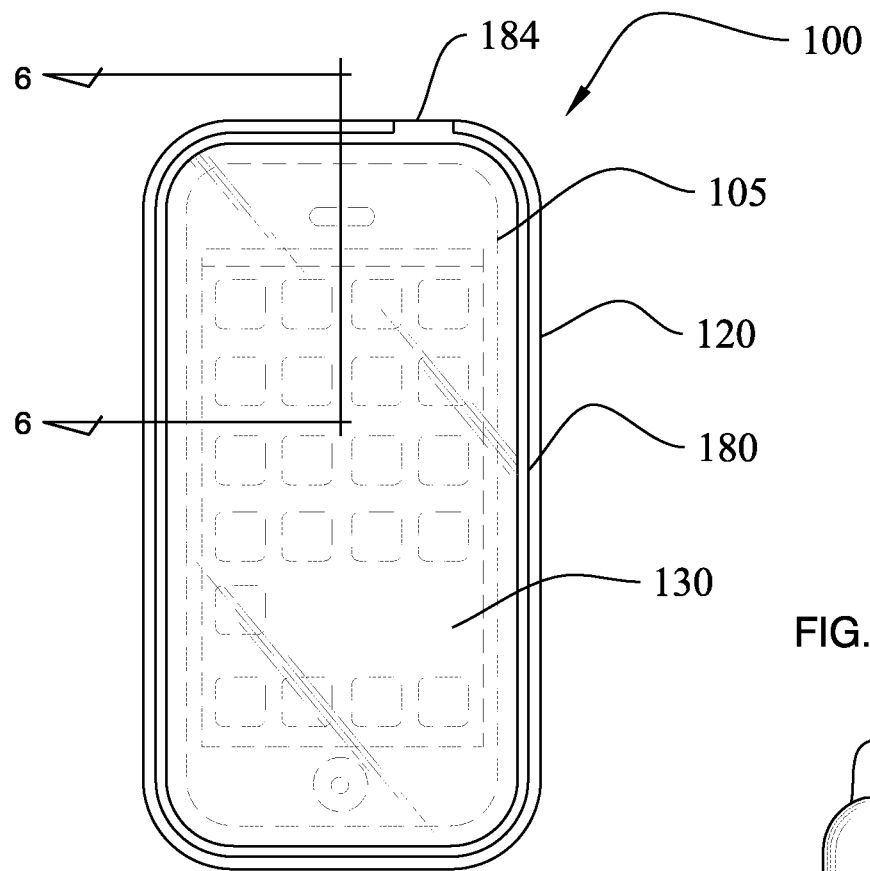
FIG. 1 is a top view of a mobile device case, showing an installed mobile device in hidden lines, in accordance with certain embodiments of the present invention.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

First Example Embodiment

FIG. 1 depicts a top view of a mobile device 105 encapsulated within a case 100 according to the present invention. Notably, the mobile device 105 is shown in dashed lines, indicating that it is not part of the invention. Moreover, the invention is not limited to use with a particular mobile device. Rather, it will be understood by those of skill in the art that the features and concepts discussed herein can be applied to create cases for mobile devices of other shapes, dimensions and thicknesses by, for example, changing the mold used to form the backing, and/or changing the dimensions of the protective membrane. For demonstration purposes only, the mobile device displayed generally depicts an iPhone from APPLE, but it will be understood that various components of the case could be moved to accommodate different positioning of different components of different mobile device models (such as different positioning of volume or power controls).

The case 100 is of a clamshell variety, having a bottom shell 120 and a top membrane 130. The membrane 130 is transparent or translucent, and seats directly against or just over the top surface of the mobile device 105, allowing a user to interact with a capacitive touch screen surface of the device 105 by running a finger along the upper surface of the membrane 130 when installed. The membrane is preferably formed of an impact resistant glass, such as GORILLA GLASS by CORNING or other hard transparent or translucent materials such as sapphire. The membrane 130 is surrounded by membrane bezel 180 on all sides. Membrane bezel 180 is preferably made of a rigid plastic material that will hold its shape. However, it may be a flexible elastomer in some embodiments. As shown more clearly in FIGS. 5 and 5A, membrane bezel 180 provides a shelf 182 to receive the membrane 130. The membrane 130 and bezel 180 are joined along an adhesive layer 132 forming a membrane assembly. Once assembled, the membrane assembly is not intended to come apart. More specifically, when a user installs or removes a device from case 100, the membrane assembly (membrane 130 and bezel 180) are removed as a single unit.

Figure 2:
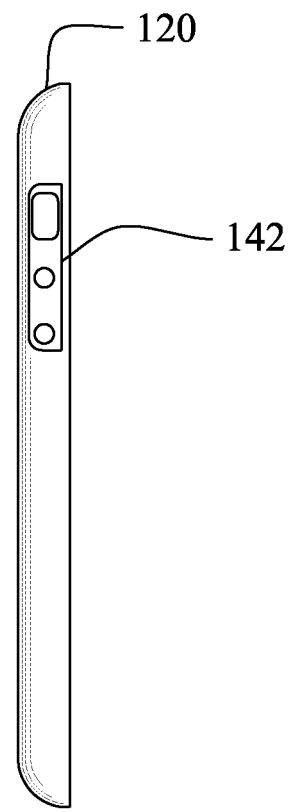
FIG. 2 is a side profile view of the mobile device case illustrated in FIG. 1.
Figure 6:
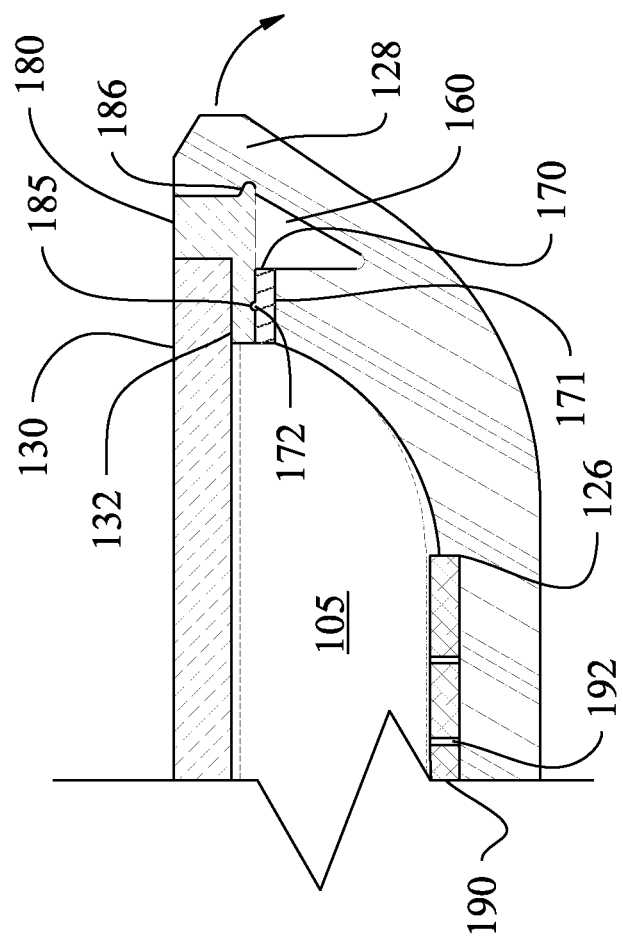
FIG. 6 is a section view through the mobile device case illustrated in FIG. 1, taken through section A.

Mobile device 105 is seated within bottom shell 120, which forms upward-extending sidewalls around and beyond the mobile device 105 on all sides. The bottom shell is a generally rigid, hard material such as a polycarbonate (or any other suitable material). However, as will be explained, it does have some level of flexibility so as to receive and hold in the membrane/bezel combination. The portion of the bottom shell 120 that extends beyond the mobile device 105, referred to herein as the outer lip 128, is configured to receive the membrane assembly. As will be explained in more detail in association with FIG. 6, the outer lip 128 may be pulled outward slightly to make room for the membrane 130 and bezel 180, and then snaps back resiliently to hold the membrane assembly in place along its sides. The resulting top surface of the case 100 is completely level and flush, as shown in FIGS. 2 and 6. In order to remove the mobile device 105 from case 100, the bezel 180 provides a release tab 184 that can be used to pull the membrane assembly out and away from the outer lip 128 of the bottom shell 120. The release tab seats within a cutaway 124 of the outer lip 128. The cutaway 124 is more clearly shown in the isolated view of the bottom shell 120 in FIG. 4. Though shown along the top edge of the case in the disclosed embodiment, it will be understood that this tab 184 could be located at other places around the perimeter of the case 100.

Figure 3:
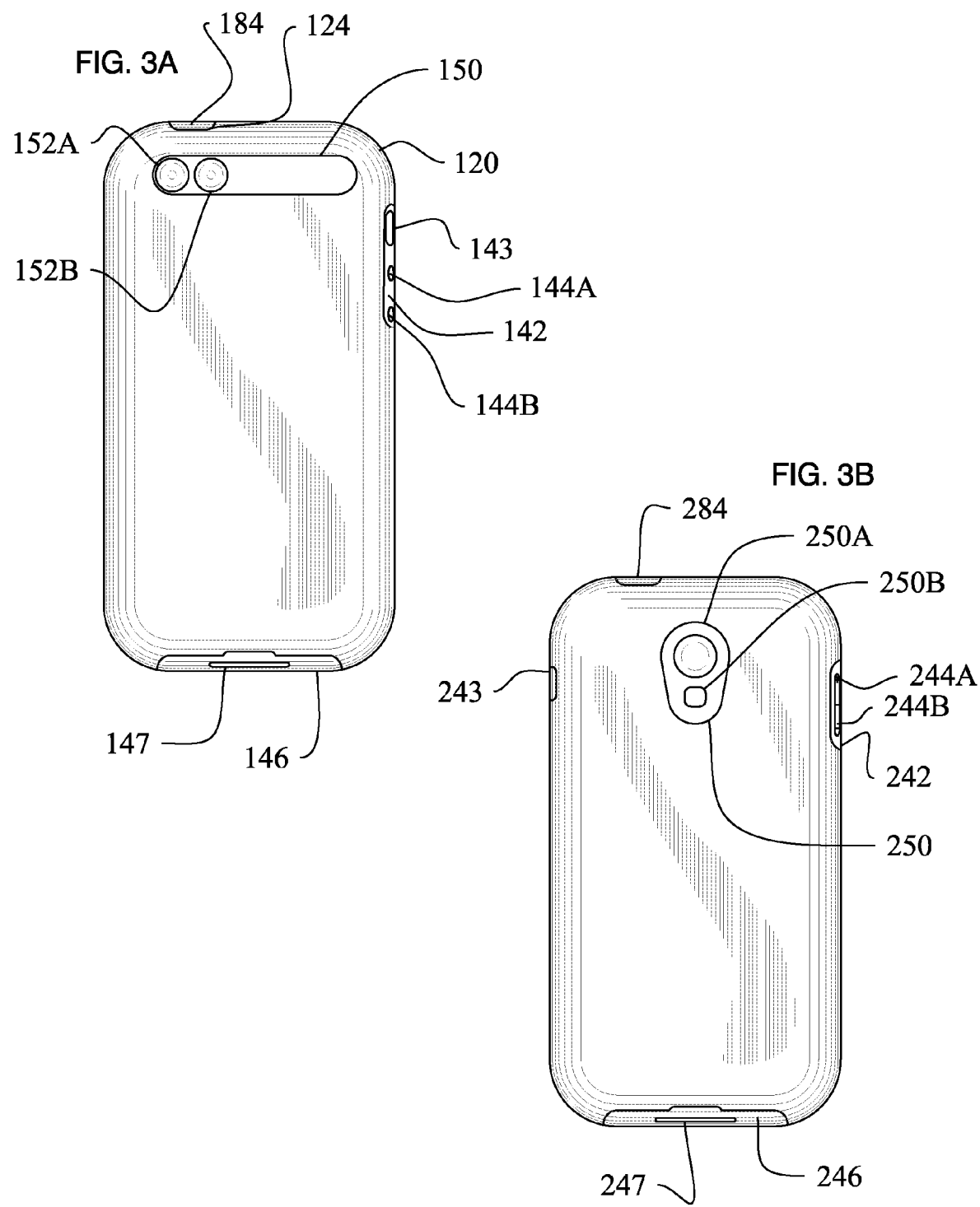
FIG. 3A is a rear view of the mobile device case illustrated in FIG. 1.
FIG. 3B is a rear view of a mobile device case according to an alternative embodiment.
Figure 4:
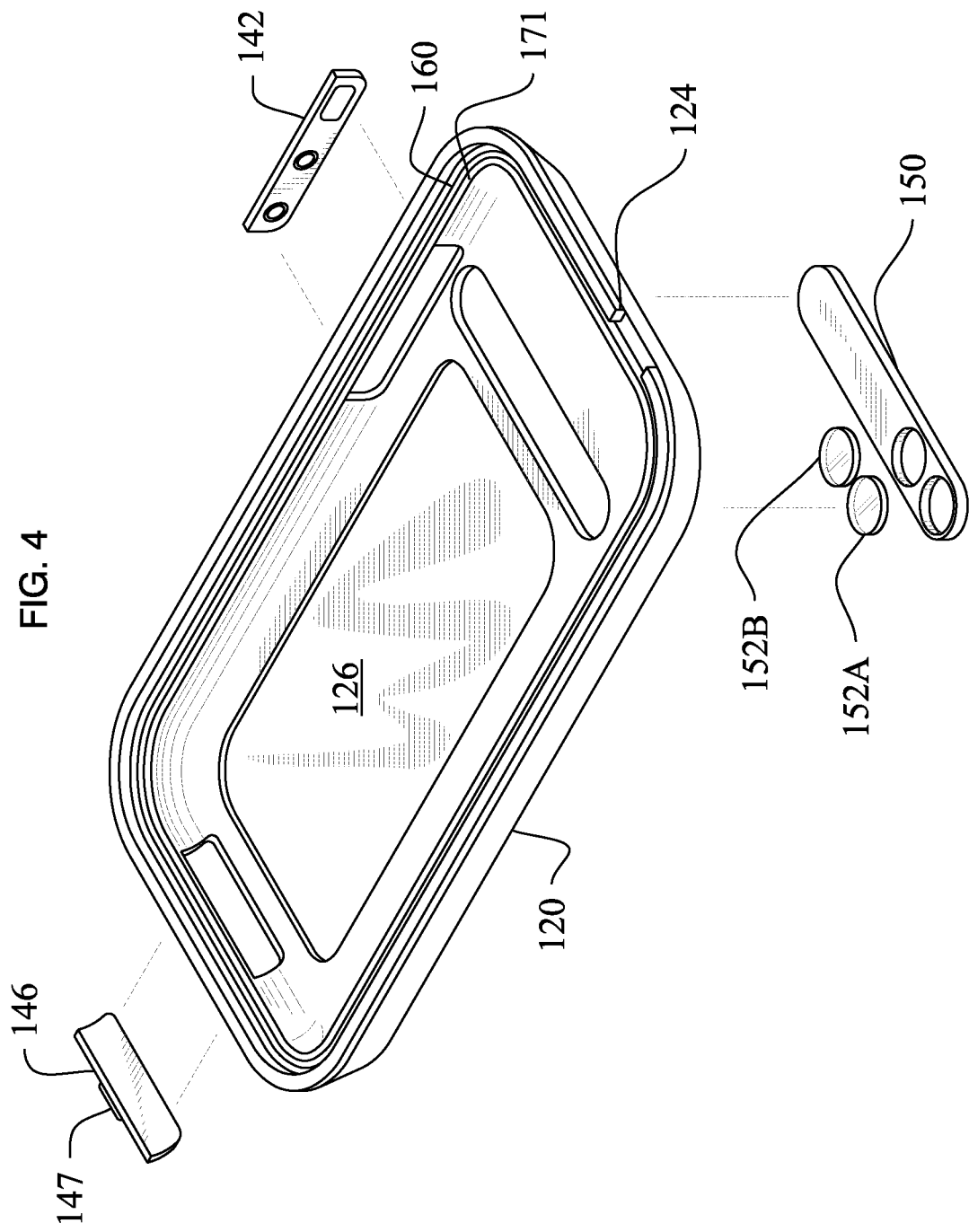
FIG. 4 is an isolated perspective view of the bottom shell of the mobile device case illustrated in FIG. 1, with certain sub-components illustrated in exploded view.

As shown in FIGS. 2-4, the bottom shell 120 has additional cutouts to allow a user to interface with certain controls in a contained device, or to allow certain features to properly function. The cutouts are then covered with rubber overmolds or lenses to seal the cutouts, but allow for proper interface/function. The exact location of these controls and features will vary from one device to another. Thus, it will be understood that the location, shape, size and quantity of these cutouts in the bottom shell 120 will also vary. For example, FIGS. 3A and 3B show rear views of two different embodiments—one generally designed to accommodate an APPLE product, and the other generally designed to accommodate a SAMSUNG product. From the back side of the case, the controls overmold 142 is on the right, and volume up and down tabs 144A, 144B, as well as power tab 143. The actual controls are not exposed. However, the overmold 142 is formed in a shape to accommodate them, and is flexible, such that when, for example, power tab 143 on the overmold is pressed, the pressure translates to engage the actual power tab on the sealed-in mobile device. This same concept is used for control overmold 243 and volume overmold 242 on the SAMSUNG version shown in FIG. 3B. The design of the camera overmold 150, 250 also changes based on the design of the enclosed mobile device 105. Lens cover 152A, 252A and IR cover 152B, 252B are generally formed of a transparent or translucent film layer that is permanently sealed to their respective camera overmolds.

Finally, power input overmold 146, 246 is positioned in a location to allow for access to a power input on the device 105. Unlike the other overmolds, power input overmold 146, 256 must be removed or pulled back in order to allow direct access to the mobile device 105 during charging. In some embodiments, the overmold will be cut on three sides so that it may be peeled back but not fully removed from the bottom shell 120. The overmold will be formed of a resilient material such that it will spring back to its original shape, and can be pressed in to seal around the power input to the device 105 when not charging. An extractor lip 147 is formed into the control overmold 146 to facilitate peeling it back for powering the device. Note that, in FIGS. 3A and 3B, release tab 184, 284 is shown at the top of the case where there is a break in the perimeter of the case 100.

FIG. 4 shows a perspective view of the bottom shell 120 with each of the overmolds exploded outward. In this embodiment, a cavity 126 is formed on the inner surface of the bottom shell 120 that faces the back of a mobile device 105 (when installed). This cavity 126 provides a housing for padding 190, as shown in the exploded view of FIG. 5. The padding 190 is formed of a preferably compressible, cushioning material such as polystyrene (or any other suitable material), and is placed between the mobile device 105 and the bottom shell 120 along a portion of the back of the device 105 to provide additional protection from impacts. A cross-section showing placement of the padding 190 is shown in FIG. 6. The padding will preferably be permanently adhered to the bottom shell 120 within cavity 126.

In addition to impact absorption, the padding serves to help with heat dissipation and sound travel. Generally, a mobile device 105 will have a battery and electronic circuitry packaged along its back side. This is the area on the device that generates the most heat. Most prior art cases trap this heat by failing to provide spacing between the device and the case. Here, the padding 190 provides holes 192 and channels 194 (filled with ambient air) that help the heat transfer away and allow the device to more efficiently cool. These holes and channels also allow for improved sound wave travel within the case. This is helpful in cases where a mobile device 105 may package a speaker or audio output along the back of the case that would otherwise be muffled were the bottom shell 120 flush to the back of the device 105.

Figure 5:
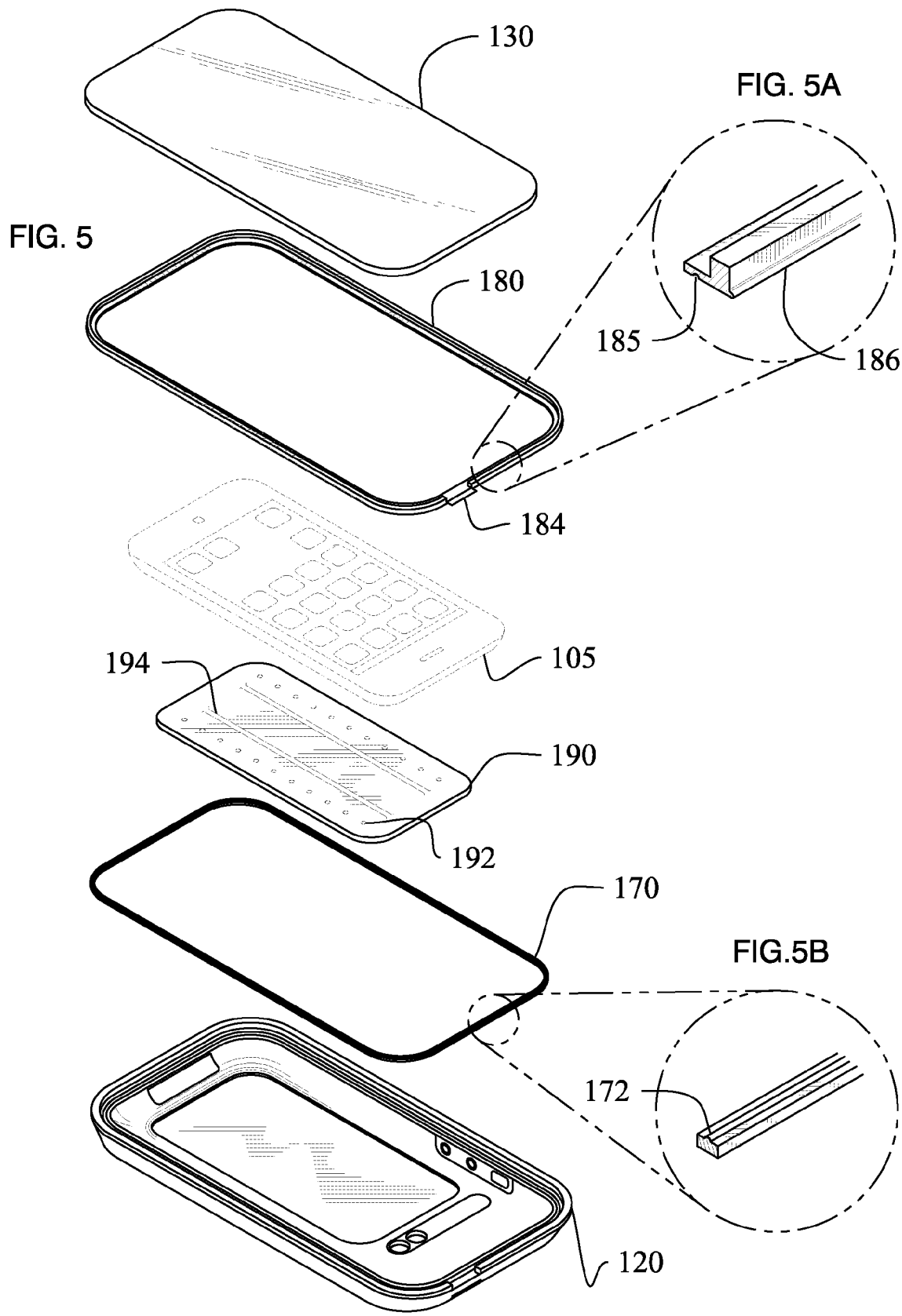
FIG. 5 is an exploded isometric view showing various components of the mobile device case illustrated in FIG. 1.

Also shown in FIG. 4 is gasket track 171, which runs around the inside perimeter of the bottom shell 120. Unlike in the case of the outer lip 128 where the cutaway 124 is formed, there is no break in the gasket track 171. As shown in FIGS. 5 and 6, this gasket track forms a flat, upward-facing shelf that receives gasket 170. Gasket 170 may be formed of a material similar to membrane bezel 180. In the preferred embodiment, gasket 170 will be permanently adhered to the gasket track 171. Separating gasket track 171 from the outer lip 128 is a trough 160, also running the perimeter of the bottom shell 120. The trough 160 is best shown in the cross-section view of FIG. 6. The trough serves to separate the gasket track from the outer lip 128, and facilitates the outer lip being pulled slightly outboard (see the arrow in FIG. 6) to allow for seating of the membrane assembly in place once the mobile device 105 has been placed in the bottom shell 120. Thus, as the outer lip 128 is pulled outboard, the gasket track 171 generally stays in place to receive the bezel 180. While the trough 160 facilitates this assembly step, repeated installations may place a load on the section of the bottom shell 120 at the base of the trough 160 where the outer lip 128 separates. In some models, this area may be reinforced by forming lateral ribs (not shown) across the trough 160 at certain positions along the perimeter. These ribs act like plastic rebar to help reinforce the interface at the bottom of the trough 160.

FIGS. 5A and 5B show close-up cross-sectional views of both the gasket 170 and the membrane bezel 180. These two elements mate together (as shown in FIG. 6) in order to provide a water-tight seal between the membrane assembly and the bottom shell 120. Specifically, the gasket 170 provides an upward extending rib 172 that seats inside a notch 185 along the bottom of the membrane bezel 180. The membrane bezel 170 is held in place laterally and pulled down by the pressure of the resilient outer lip 128, which compresses around its outer perimeter. As shown in FIG. 6, the bezel 180 also provides an annular ledge 186 that extends outward along its base and is received into a notch formed in the outer lip 128 of the bottom shell 120. This interfaces forms an additional seal between the device 105 and the outside environment.

When assembled to the user, the case 100 forms two primary, separable assemblies. The bottom assembly comprises bottom shell 120, the overmolds, the padding 190 and the gasket 170. The upper assembly (membrane assembly) comprises membrane 130 and membrane bezel 180. The device 105 is placed in this bottom assembly (see FIG. 5), and then the top assembly is fit over the top of the device 105. To install the top assembly, a user pulls the outer lip 128 of the bottom shell 120 outward along the perimeter in order to work/snap the top assembly into place, thereby forming a first seal between the bezel 180 and the outer lip, and a second seal between the bezel and the gasket. The resulting profile (i.e., external shape) of the case 100 mirrors that of the now-installed mobile device 105, as shown in the cross section view of FIG. 6. More specifically, the fully-assembled case forms a top surface that is completely flat (i.e., there is no raised obtrusive protective rim).

Second Example Embodiment

Figures 7, 8:
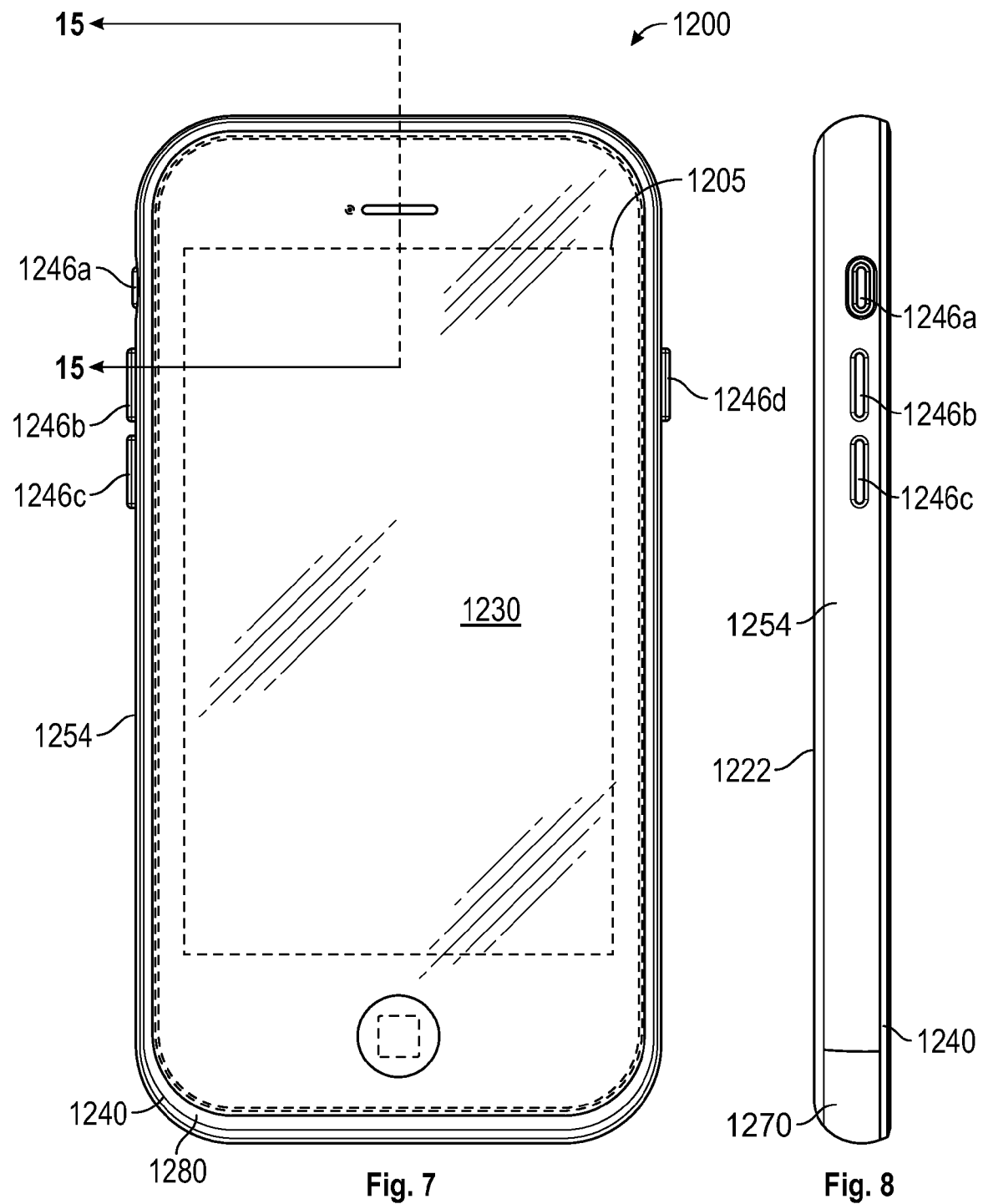
FIG. 7 is a top view of a mobile device case, showing an installed mobile device in hidden lines, in accordance with other embodiments of the present invention.
FIG. 8 is a side profile view of the mobile device case illustrated in FIG. 7.

FIG. 7 depicts a top view of a mobile device 1205 encapsulated within a case 1200 according to the present invention. Notably, the mobile device 1205 is shown in dashed lines, indicating that it is not part of the invention. Moreover, the invention is not limited to use with a particular mobile device. Rather, it will be understood by those of skill in the art that the features and concepts discussed herein can be applied to create cases for mobile devices of other shapes, dimensions and thicknesses by, for example, changing the mold used to form the backing, and/or changing the dimensions of the protective membrane. For demonstration purposes only, the mobile device displayed generally depicts an iPhone from APPLE with slightly different controls than that of the mobile device 105 used demonstrably above, but it will be understood that various components of the case could be moved to accommodate different positioning of different components of different mobile device models (such as different positioning of volume or power controls).

The case 1200 is of a clamshell variety and includes an upper assembly 1210 and a bottom assembly 1220 attachable to (and separable from) the upper assembly 1210 to form a watertight inner cavity therebetween. As described in detail below, to install the mobile device 1205 into the case 1200, a user places the mobile device 1205 in the upper assembly 1210 and then attaches the bottom assembly 1220 to the upper assembly 1210 to enclose the mobile device 1205 within the watertight inner cavity of the case 1200. The resulting profile (i.e., external shape) of the case 1200 mirrors that of the mobile device 1205 installed therein. More particularly, the case 1200 generally includes a top surface, a bottom surface, and spaced-apart inner and outer perimeters extending between the top and bottom surfaces. As described below, the top surface of the case 1200 is made up of or includes the top surfaces of various other components of the case 1200, and those component top surfaces are flush with one another such that the top surface of the case 1200 is completely flat (i.e., does not include an obtrusive raised protective rim).

Turning to the upper assembly 1210, as best shown in FIGS. 9, 10, 11, 12, 12A, 12B, and 15, the upper assembly 1210 includes an upper assembly body 1260 and a screen membrane 1230 fixedly attached to the upper assembly body 1260.

The upper assembly body 1260 forms the top surface and the inner and outer perimeters of the case 1200 and includes: a first upper assembly body portion 1240, a second upper assembly body portion 1250, a headphone jack door 1270, a headphone jack door connector 1275, a power input door 1280, and a power input door connector 1285.

Figure 9:
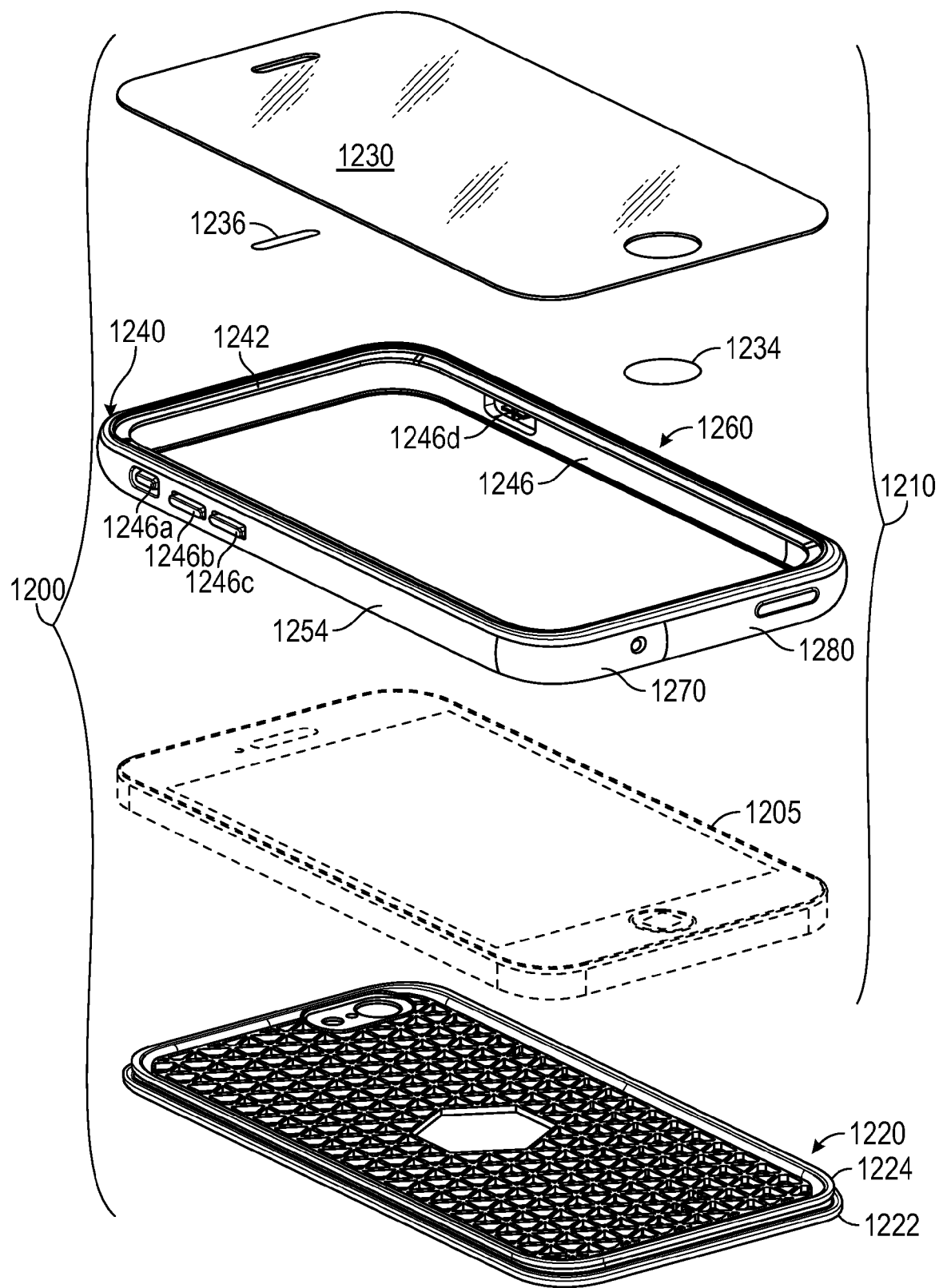
FIG. 9 is a partially exploded top perspective view of the mobile device case illustrated in FIG. 7.
Figure 10:
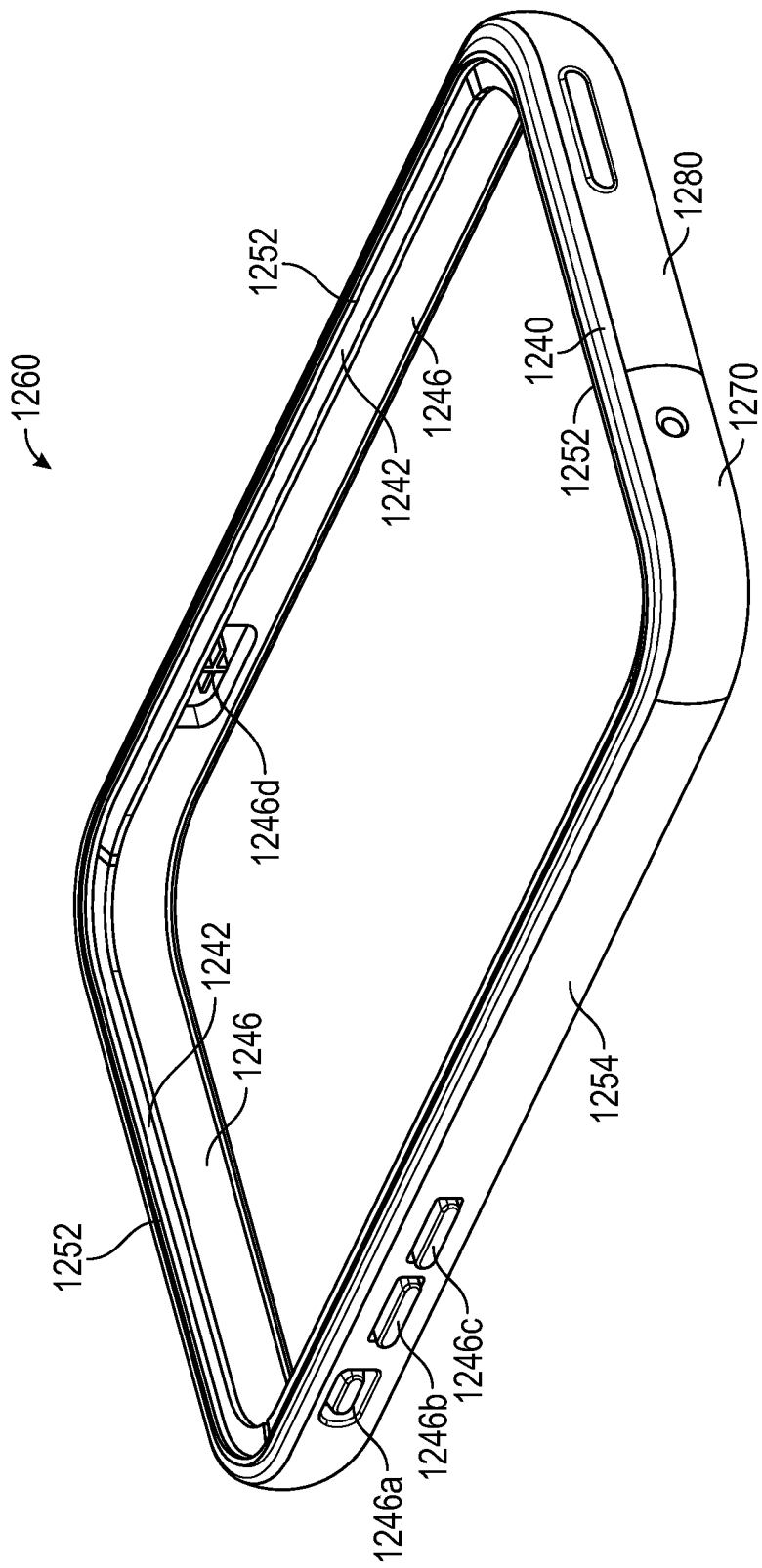
FIG. 10 is a top perspective view of the upper assembly body of the mobile device case illustrated in FIG. 7.
Figure 12:
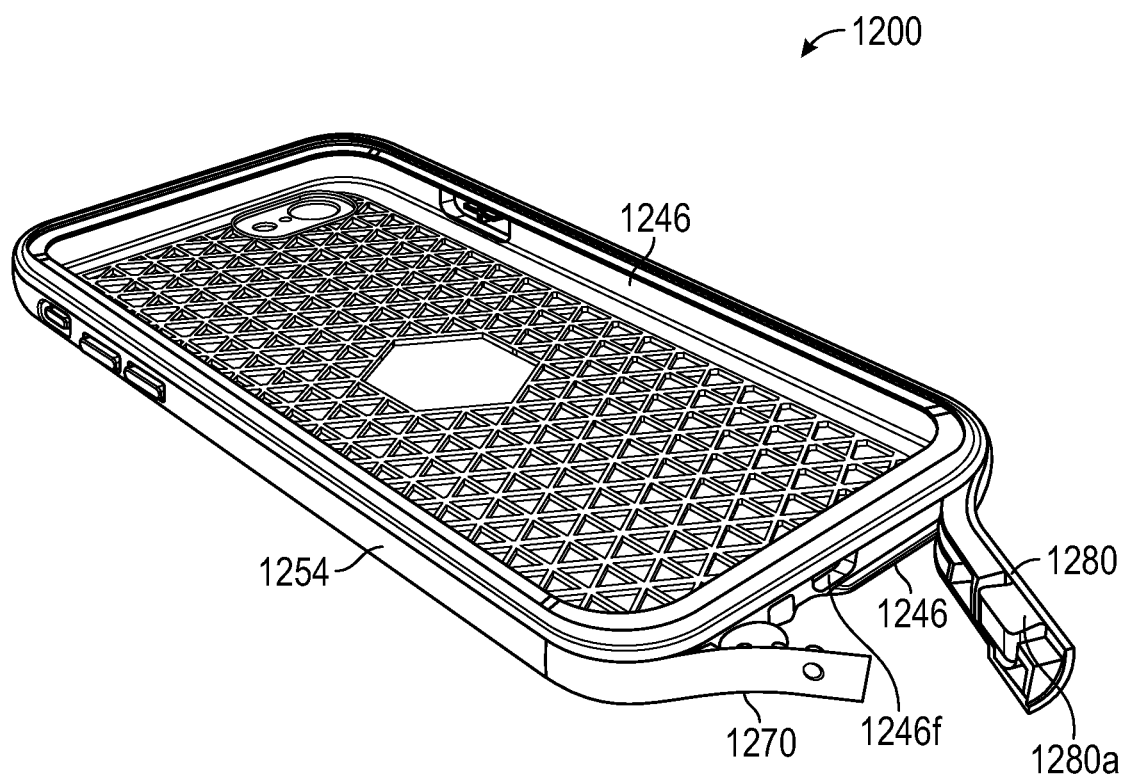
FIG. 12 is a top perspective view of the mobile device case illustrated in FIG. 7 with the mobile device and the membrane removed and with the headphone jack and power input doors in their open positions.

The first upper assembly body portion 1240 includes a membrane track 1242 that runs around an inside perimeter of the first upper assembly body portion 1240. The membrane track 1242 forms a substantially flat shelf to which the screen membrane 1230 may be attached (such as via an adhesive 1282, as described below) and that supports the screen membrane 1230. In this illustrated embodiment, there is a break in the membrane track 1242 near each corner of the first upper assembly body portion 1240, though as best shown in FIGS. 9, 10, and 12, the second upper assembly body portion 1250 includes a plurality of break fillers that fill these breaks to form a continuous membrane track 1242.

Figure 15:
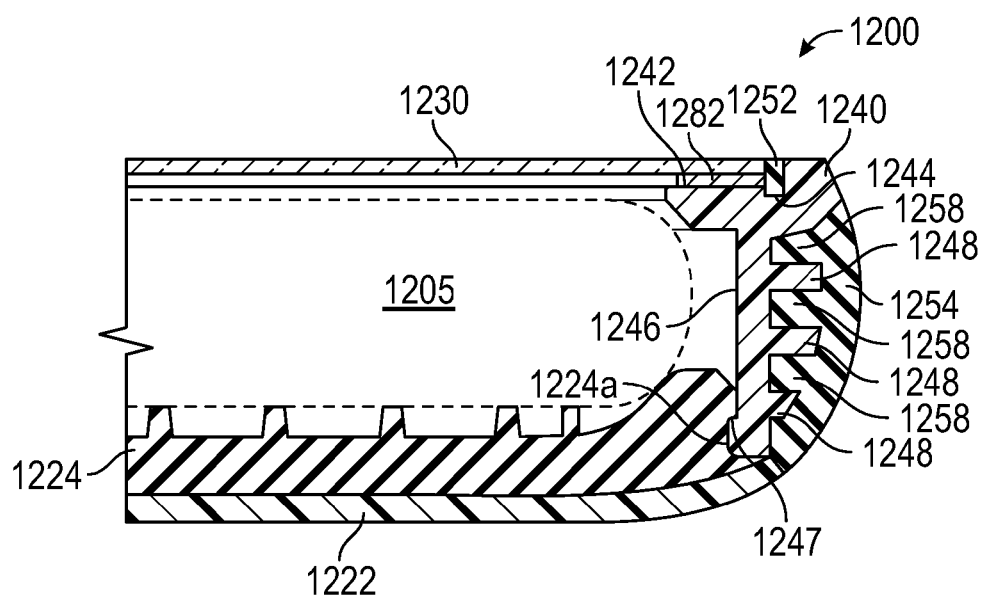
FIG. 15 is a section view through the mobile device case illustrated in FIG. 7, taken through section 15-15.

The first upper assembly body portion 1240 also defines a membrane bezel receiving groove 1244 that runs around the perimeter of the first portion 1240 outward of, adjacent to, and below (or even with or above, in other embodiments) the membrane track 1242 (with respect to the orientation shown in FIG. 15). The membrane bezel receiving groove 1244 is configured to receive the membrane bezel 1252 of the second upper assembly body portion 1250, as described below.

The first upper assembly body portion 1240 also includes a downwardly-extending sidewall 1246 having an inner surface and an opposing outer surface. The inner surface of the sidewall 1246 of the first upper assembly body portion 1240 substantially forms the inner perimeter of the case 1200. The bottom of the sidewall 1246 of the first upper assembly body portion 1240 (with respect to the orientation shown in FIG. 15) terminates in a mounting ridge 1247 that protrudes inwardly from and extends around the perimeter of the inner surface of the sidewall 1246 of the first upper assembly body portion 1240 and facilitates attachment of the upper assembly 1210 to the bottom assembly 1220, as described below.

The sidewall 1246 of the first upper assembly body portion 1240 also includes a plurality of spaced-apart ribs 1248 extending outward from three of the four sides of its outer surface. The ribs 1248 facilitate attachment of the first upper assembly body portion 1240 to the second upper assembly body portion 1250, as described below, while also providing hoop strength to prevent the sidewall from bowing outward.

The sidewall 1246 of the first upper assembly body portion 1240 supports a plurality of integrated tabs, switches, or actuators that enable the user to interface with certain controls of the mobile device 1205 when the mobile device 1205 is contained within the case 1200. This ensures that that certain features of the mobile device 1205 may properly function when the mobile device 1205 is contained within the case 1200. In one embodiment, the sidewall 1246 defines a plurality of cutouts therethrough, and the cutouts are covered with rubber overmolds including the tabs, switches, or actuators. The rubber overmolds seal the cutouts. The tabs, switches, or actuators thus allow for proper interface/function with the controls of the mobile device 1205 without actually exposing those controls. The exact location of these controls and features will vary from one device to another. Thus, it will be understood that the location, shape, size, and quantity of these tabs, switches, or actuators will also vary.

Figure 11:
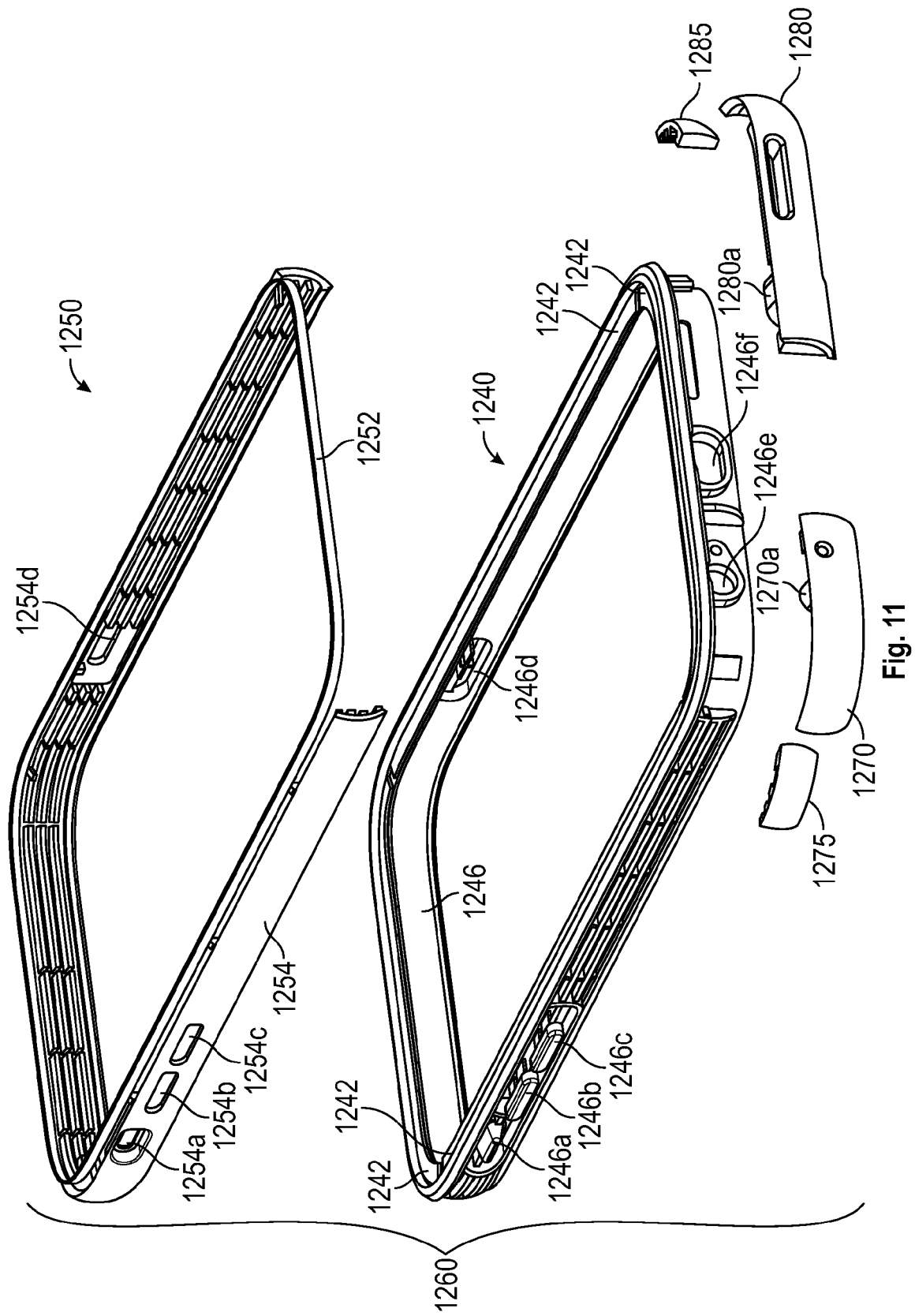
FIG. 11 an exploded top perspective view of the upper assembly body of the mobile device case illustrated in FIG. 7.

In this illustrated embodiment, as best shown in FIG. 11, the sidewall 1246 of the first upper assembly body portion 1240 supports a mute switch 1246a configured to toggle upward and downward, a volume up tab 1246b configured to move inward and outward, a volume down tab 1246c configured to move inward and outward, and a screen on/off tab 1246d configured to move inward and outward. The mute switch 1246a is formed in a shape such that when a user toggles the mute switch 1246a upward or downward, the mute switch 1246a engages and translates the upward or downward pressure to the rocker panel of the mobile device 1205. The volume up tab 1246b is formed in a shape such that when a user presses the volume up tab 1246b, the volume up tab 1246b engages and translates the pressure to the volume up control of the mobile device 1205. The volume down tab 1246c is formed in a shape such that when a user presses the volume down tab 1246c, the volume down tab 1246c engages and translates the pressure to the volume down control of the mobile device 1205. The screen on/off tab 1246d is formed in a shape such that when a user presses the screen on/off tab 1246d, the screen on/off tab 1246d engages and translates the pressure to the screen on/off tab control of the mobile device 1205.

The sidewall 1246 of the first upper assembly body portion 1240 defines a headphone jack opening 1246e therethrough and a power input opening 1246f therethrough. The headphone jack opening 1246e is positioned such that, when the mobile device 1205 is contained within the case 1200 and the headphone jack door 1270 is peeled back to its open position (described below), a headphone plug (not shown) can be inserted through the headphone jack opening 1246e and into the headphone jack of the mobile device 1205. The headphone jack opening 1246e is configured to receive a headphone jack opening sealer 1270a of the headphone jack door 1270 therein when the headphone jack door 1270 is in its closed position (described below) to seal the headphone jack opening 1246e. Similarly, the power input opening 1246f is positioned such that, when the mobile device 1205 is contained within the case 1200 and the power input door 1280 is peeled back into its open position (described below), a power input device (not shown) can be inserted through the power input opening 1246f and into a corresponding power input device receiving opening of the mobile device 1205. The power input opening 1246f is configured to receive a power input opening sealer 1280a of the power input door 1280 therein when the power input door 1280 is in its closed position (described below) to seal the power input opening 1246f, as described below.

The first upper assembly body portion 1240 is made of a generally rigid, hard material such as polycarbonate (or any other suitable material). However, as will be explained, in certain embodiments the first upper assembly body portion 1240 and, particularly, the sidewall 1246 of the first upper assembly body portion 1240, has some level of flexibility and resiliency so as to enable the upper assembly 1210 to be snap-fit to the bottom assembly 1220.

The second upper assembly body portion 1250 includes the membrane bezel 1252 and an outer cushion 1254 attached to the membrane bezel 1252.

The membrane bezel 1252 is attached to the membrane bezel receiving groove 1244 of the first upper assembly body portion 1240.

Particularly, in this embodiment, the membrane bezel 1252 is fit into the membrane bezel receiving groove 1244 of the first upper assembly body portion 1240, though it should be appreciated that the membrane bezel may be attached to the membrane bezel receiving groove in any other suitable manner, such as via an adhesive. The membrane bezel 1252 is sized such that, after attachment to the first upper assembly body portion 1240, the top surface of the membrane bezel 1252 is flush with the top surface of the screen membrane 1230 and the top surface of the first body portion 1240 (as best shown in FIGS. 8 and 15).

The outer cushion 1254 of the second upper assembly body portion 1250 has an inner surface, an opposing outer surface, and a plurality of spaced-apart ribs 1258 extending inward from the inner surface. The outer surface of the outer cushion 1254 of the second upper assembly body portion 1250, the headphone jack door 1270 (described below), and the power input door 1280 (described below) substantially form the outer perimeter of the case 1200. The ribs 1258 facilitate attachment of the outer cushion 1254 of the second upper assembly body portion 1250 to the first upper assembly body portion 1240.

More specifically, to attach the outer cushion 1254 of the second upper assembly body portion 1250 to the first upper assembly body portion 1240, the ribs 1258 of the outer cushion 1254 of the second upper assembly body portion 1250 are fit into the gaps between the ribs 1248 of the first upper assembly body portion 1240, and the ribs 1248 of the first upper assembly body portion 1240 are fit into the gaps between the ribs 1258 of the outer cushion 1254 of the second upper assembly body portion 1250.

The outer cushion 1254 of the second upper assembly body portion 1250 defines a plurality of tab, switch, or actuator receiving openings therethrough that are configured receive and enable the tabs, switches, or actuators of the first upper assembly body portion 1240 to pass therethrough. Specifically, the outer cushion 1254 defines a mute switch receiving opening 1254a, a volume up tab receiving opening 1254b, a volume down tab receiving opening 1254c, and a screen on/off tab receiving opening 1254d therethrough. The mute switch receiving opening 1254a is configured to receive and enable the mute switch 1246a to pass therethrough, the volume up tab receiving opening 1254b is configured to receive and enable the volume up tab 1246b to pass therethrough, the volume down tab receiving opening 1254c is configured to receive and enable the volume down tab 1246c to pass therethrough, and the screen on/off tab receiving opening 1254d is configured to receive and enable the screen on/off tab 1246d to pass therethrough. As best shown in FIG. 7, in this illustrated embodiment, these tabs and switches protrude from their corresponding openings defined through the outer cushion 1254.

The second upper assembly body portion 1250 is made of a generally compressible, cushioning material such as thermoplastic polyurethane (or any other suitable material). The components of the second upper assembly body portion 1250 thus have impact-absorption qualities that protect the mobile device 1205 itself and other components of the case 1200.

For instance, the membrane bezel 1252 that surrounds the perimeter of the screen membrane 1230 is configured to absorb impact to the screen membrane 1230 when the case 1200 is dropped or otherwise impacted to reduce the impact to the screen membrane 1230, thus reducing the likelihood that the impact will break the screen membrane 1230.

Figure 12A:
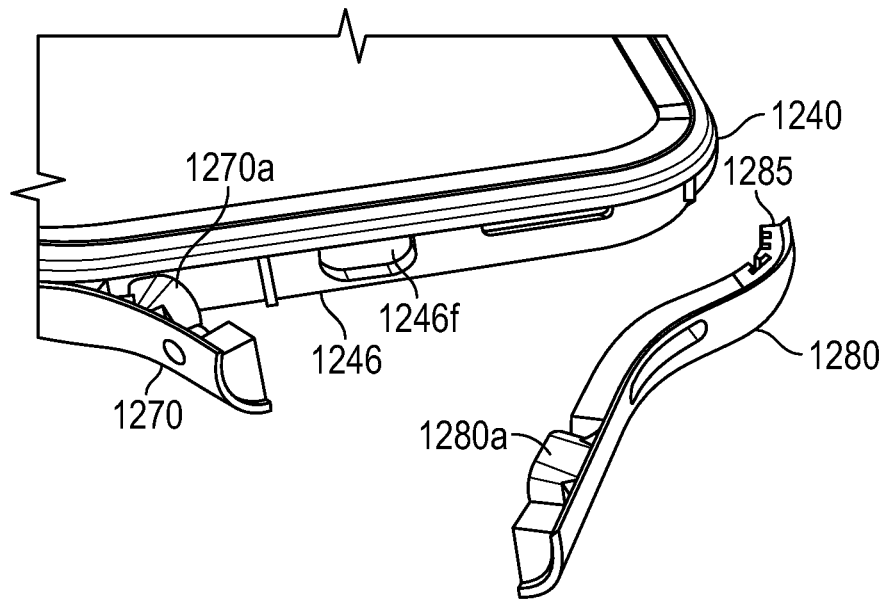
FIG. 12A is an enlarged top perspective view of the headphone jack and power input doors of the mobile device case illustrated in FIG. 7 in their open positions.
Figure 12B:
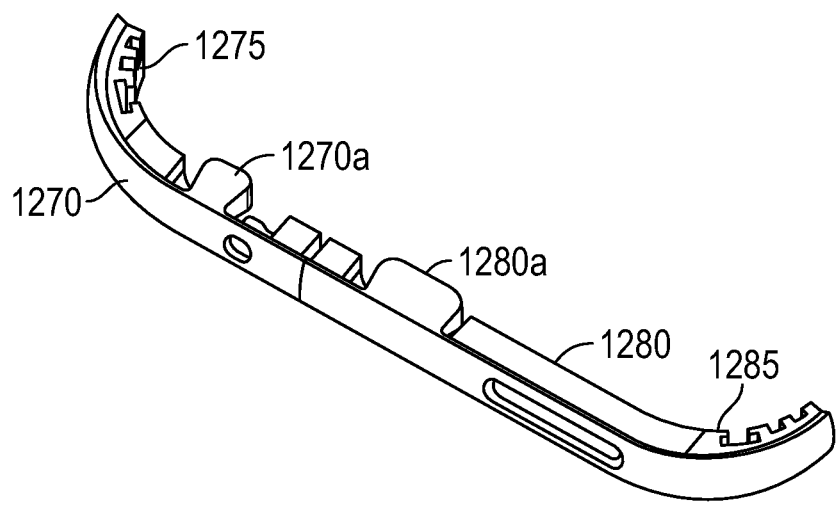
FIG. 12B is a top perspective view of the headphone jack and power input doors of the mobile device case illustrated in FIG. 7 and their corresponding headphone jack door and power input door connectors removed from the remaining components of the mobile device case.
Figure 13:
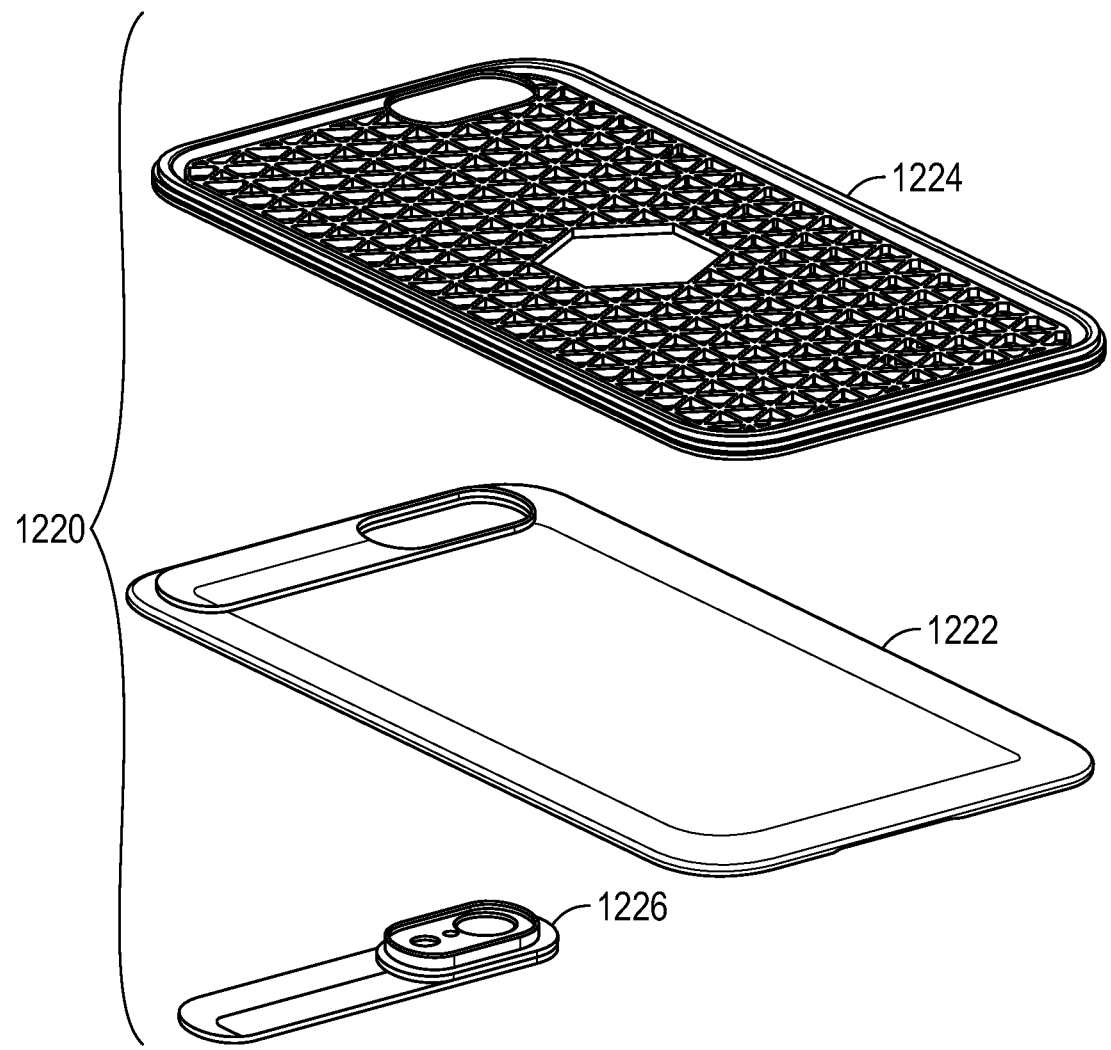
FIG. 13 is an exploded top perspective view of the lower assembly of the mobile device case illustrated in FIG. 7.

The headphone jack door 1270 includes a headphone jack opening sealer 1270a, and is attached to the upper assembly body 1260 via the headphone jack door connector 1275 such that the headphone jack door 1270 is movable between: (1) a closed position in which the headphone jack opening sealer 1270a is received in and seals the headphone jack opening 1246e of the sidewall 1246 of the first upper assembly body portion 1240 (as best shown in FIGS. 9 and 10); and (2) an open position in which the headphone jack opening sealer 1270a is removed from the headphone jack opening 1246e, thereby enabling direct access to the headphone jack of the mobile device 1205 (as best shown in FIGS. 12 and 12A).

More specifically, the headphone jack door connector 1275 is attached to the sidewall 1246 of the first upper assembly body portion 1240 via a snap fit, an adhesive, and/or any other suitable attachment mechanism. The headphone jack door connector 1275 is made of a generally rigid, hard material such as polycarbonate (or any other suitable material). The headphone jack door 1270 is attached to the headphone jack door connector 1275 via an adhesive or any other suitable attachment mechanism. The headphone jack door 1270 is made of a suitable flexible, resilient material such that the headphone jack door 1270 will spring back to its original shape when deformed. The attachment of the headphone jack door 1270 to the headphone jack door connector 1275 enables the headphone jack door 1270 to be peeled back, but not fully removed, to shift the headphone jack door 1270 from its closed position to its open position and enable direct access to the headphone jack of the mobile device 1205.

The power input door 1280 includes a power input opening sealer 1280a, and is attached to the upper assembly body 1260 via the power input door connector 1285 such that the power input door 1280 is movable between: (1) a closed position in which the power input opening sealer 1280a is received in and seals the power input opening 1246f of the sidewall 1246 of the first upper assembly body portion 1240 (as best shown in FIGS. 9 and 10), and (2) an open position in which the power input opening sealer 1280a is removed from the power input opening 1246f, thereby enabling direct access to the power input device receiving opening of the mobile device 1205 (as best shown in FIGS. 12 and 12A).

More specifically, the power input door connector 1285 is attached to the sidewall 1246 of the first upper assembly body portion 1240 via a snap fit, an adhesive, and/or any other suitable attachment mechanism. The power input door connector 1285 is made of a generally rigid, hard material such as polycarbonate (or any other suitable material). The power input door 1280 is attached to the power input door connector 1285 via an adhesive or any other suitable attachment mechanism. The power input door 1280 is made of a suitable flexible, resilient material such that the power input door 1280 will spring back to its original shape when deformed. The attachment of the power input door 1280 to the power input door connector 1285 enables the power input door 1280 to be peeled back, but not fully removed, to shift the power input door 1280 from its closed position to its open position and enable direct access to the power input connector of the mobile device 1205.

As best shown in FIGS. 12 and 12A, the headphone jack door 1270 and the power input door 1280 are separately movable between their corresponding closed and open positions. In other words, the user can move the headphone jack door 1270 from its closed position to its open position to enable direct access to the headphone jack of the mobile device 1205 without also moving the power input door 1280 from its closed position to its open position, and the user can move the power input door 1280 from its closed position to its open position to enable direct access to the power input connector of the mobile device 1205 without also moving the headphone jack door 1270 from its closed position to its open position.

Figure 14:
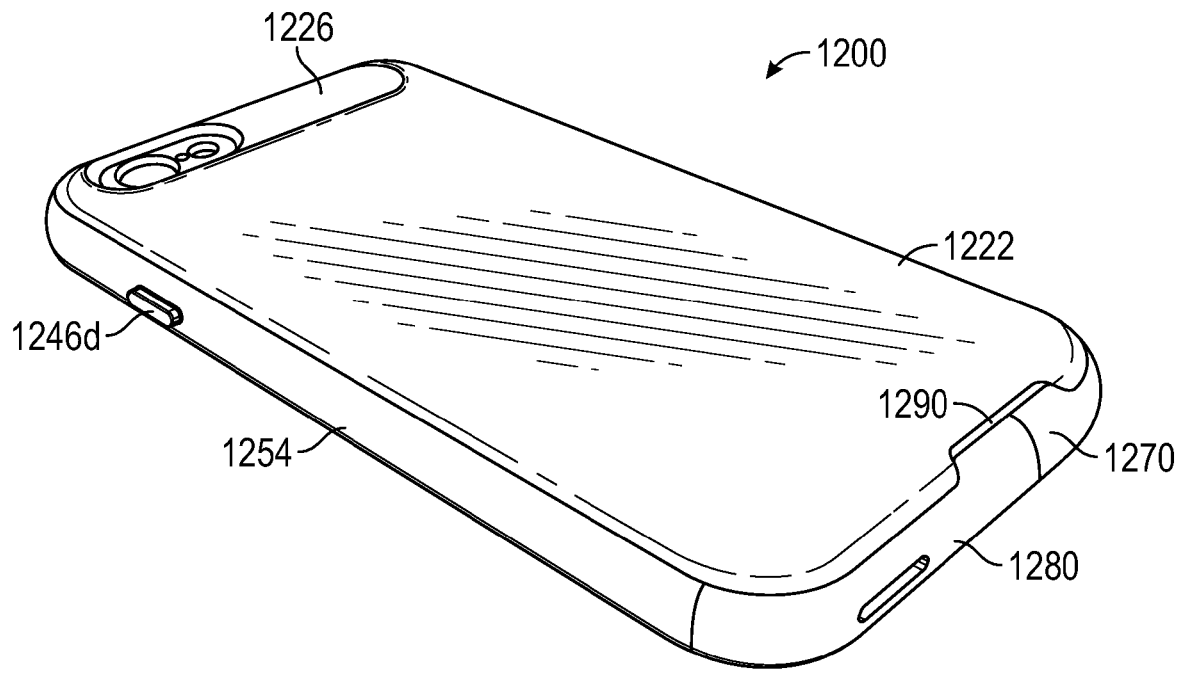
FIG. 14 is a bottom perspective view of the mobile device case illustrated in FIG. 7.

As shown in FIG. 14, an extractor lip 1290 is formed into the headphone jack door 1270 and the power input door 1280 to facilitate peeling the headphone jack door 1270 and the power input door 1280 from their corresponding closed positions to their corresponding open positions.

The screen membrane 1230 is transparent or translucent, and seats directly against or just over the top surface of the mobile device 1205 when the mobile device 1205 is contained within the case 1200, allowing a user to interact with a capacitive touch screen surface of the device 1205 by running a finger along the upper surface of the screen membrane 1230 when installed. The screen membrane 1230 is preferably formed of an impact resistant glass, such as GORILLA GLASS by CORNING, or other hard transparent or translucent materials, such as sapphire.

As shown in FIG. 9, in this example embodiment, a touchpad membrane 1234 is mounted to the bottom surface of the screen membrane 1230 and fills an opening defined through the screen membrane 1230 proximate a fingerprint reader of the mobile device 1205. The touchpad membrane 1234 prevents water from entering this opening while enabling the mobile device 1205 to read the user's fingerprint when the user touches the touchpad membrane 1235. As also shown in FIG. 9, in this example embodiment, an acoustic membrane 1236 is mounted to the bottom surface of the screen membrane 1230 and fills an opening defined through the screen membrane 1230 proximate an ear hole of the mobile device 1205. The acoustic membrane 1236 prevents water from entering this opening while enabling the user to hear audio emanating from the ear hole of the mobile device 1205.

To attach the screen membrane 1230 to the upper assembly body 1260 and form the upper assembly 1210, the adhesive 1282 is applied to the membrane track 1242 of the first upper assembly body portion 1240 and the screen membrane 1230 is then placed atop the adhesive 1282 such that the adhesive 1282 and the membrane track 1242 support the screen membrane 1230. After installation, the screen membrane 1230 is surrounded by the membrane bezel 1252 of the second upper assembly body portion 1250 on all sides and, more specifically, the membrane bezel 1252 contacts the outer perimeter of the screen membrane 1230. Once the upper assembly 1210 is formed, the screen membrane 1230, the first upper assembly body portion 1240, the second upper assembly body portion 1250, the headphone jack door 1270, the headphone jack door connector 1275, the power input door 1280, and the power input door connector 1285 are not intended to come apart. More specifically, when a user installs or removes the mobile device 1205 from the case 1200, the upper assembly 1210 separates as a single unit from the bottom assembly 1220. Thus, in this illustrated embodiment, the top surface of the case 1200 is made up of or includes the top surfaces of the screen membrane 1230, the membrane bezel 1252, and the first upper assembly body portion 1240, and those component top surfaces are flush with one another such that the top surface of the case 1200 is completely flat (i.e., does not include an obtrusive protective rim).

In certain embodiments, after curing the adhesive is transparent. In other embodiments, after curing the adhesive is translucent. In further embodiments, after curing the adhesive is opaque.

The bottom assembly 1220 includes an outer bottom assembly portion 1222, an inner bottom assembly portion 1224, and a lens assembly module 1226.

The outer bottom assembly portion 1222 is made of a generally rigid, hard material such as thermoplastic polyurethane (or any other suitable material).

The inner bottom assembly portion 1224 is attached to the outer bottom assembly portion 1222. The inner bottom assembly portion 1224 includes latticework configured to absorb impacts and transfer heat away from the mobile device 1205. It should be appreciated that this particular illustrated latticework is merely one example type of latticework that may be employed, and that any other suitable latticework may be employed. As best shown in FIG. 15, the inner bottom assembly portion 1224 defines an inwardly-extending mounting ridge receiving groove 1224a around the outer perimeter of the inner bottom assembly portion 1224. As described below, the mounting ridge receiving groove 1224a is configured to receive the mounting ridge 1247 of the upper assembly 1210 to attach the bottom assembly 1220 to the upper assembly 1210.

The inner bottom assembly portion 1224 is made of a generally compressible, cushioning material such as polystyrene (or any other suitable material).

The lens assembly module 1226 facilitates use of the camera on the back of the mobile device 1205 when the mobile device 1205 is contained within the case 1200. The lens assembly module 1226 is set in a rigid plastic housing that is attached to the outer bottom assembly portion 1222 via a snap-fit, a press-fit, an adhesive, or any other suitable manner. In various embodiments, the lens assembly module 1226 is configured to reduce or prevent reflection, such as by being made of a dark colored material.

To install the mobile device 1205 into the case 122 in this embodiment, a user first places the mobile device 1205 in the upper assembly 1210. The user then positions the top surface of the inner bottom assembly portion 1224 against the bottom surface of the mounting ridge 1247 of the sidewall 1246.

The user then pushes the bottom assembly 1220 toward the screen membrane 1230, which forces the inner bottom assembly portion 1224 to comply inward, until the mounting ridge 1247 is received in the mounting ridge receiving groove 1224a of the inner bottom assembly portion 1224. As best shown in FIG. 15, once the mounting ridge 1247 is received in the mounting ridge receiving groove 1224a, the inner bottom assembly portion returns to its original shape, thereby retaining the mounting ridge 1247 within the mounting ridge receiving groove 1224a, attaching the upper and lower assemblies 1210 and 1220, enclosing the mobile device 1205, and forming a watertight seal between the upper and lower assemblies 1210 and 1220.

To install the mobile device 1205 into the case 1200 in another embodiment, a user first places the mobile device 1205 in the upper assembly 1210. The user then attaches the bottom assembly 1220 to the upper assembly 1210 by pulling the sidewall 1246 of the upper assembly 1210 outward and working the mounting ridge 1247 extending around the perimeter of the sidewall 1246 into the mounting ridge receiving groove 1224a of the bottom assembly 1220. As best shown in FIG. 15, once the mounting ridge 1247 is received in the mounting ridge receiving groove 1224a, the sidewall 1246 snaps back to its original shape, thereby attaching the upper and lower assemblies 1210 and 1220, enclosing the mobile device 1205, and forming a watertight seal between the upper and lower assemblies 1210 and 1220.

It will be understood by those skilled in the art that various changes may be made and equivalents may be substituted without departing from the scope of the novel and non-obvious techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

What is claimed is:

1. A case forming a substantially rectangular housing for a mobile device, said case comprising:
    an upper assembly comprising:
        a transparent screen membrane having four edges forming a membrane perimeter; and
        an upper assembly body extending around the membrane perimeter and perpendicularly downward therefrom to define sidewalls of the rectangular housing, assembly body comprising:
            an outer cushion that at least partially surrounds an outer surface of the sidewalls; and
            at least one flexible door movable between a closed position in which the at least one flexible door provides a seal over an input or output of the mobile device and an open position in which the at least one flexible door provides access to an inner cavity, wherein the at least one flexible door opens toward a first side of the rectangular housing and closes to seal against a second flexible door that opens toward a second side of the rectangular housing;
    and;
    a bottom assembly attachable to the upper assembly body to form the inner cavity configured to house the mobile device,
    wherein an upper surface of the screen membrane is flush with the highest surface of the upper assembly body existent along at least two of the four edges.

2. The case of claim 1, wherein the bottom assembly is attachable to the upper assembly such that the inner cavity is watertight.

3. The case of claim 1, wherein the upper assembly body provides a membrane track to support a portion of a lower surface of the screen membrane.

4. The case of claim 3, wherein the screen membrane is attached to the membrane track via an adhesive.

5. The case of claim 1, wherein the upper surface of the screen membrane is flush with the highest surface of the upper assembly body existent along at least three of the four edges.

6. The case of claim 1, wherein the screen membrane comprises a touchpad membrane and an acoustic membrane.

7. The case of claim 1, wherein the upper surface of the screen membrane forms at least a portion of the highest surface of the case.

8. The case of claim 1, wherein the sidewalls are made of a first material and the outer cushion is made of a second material, and wherein the first material is more rigid than the second material.

9. The case of claim 8, wherein the sidewalls comprise a plurality of outwardly-extending ribs and the outer cushion comprises a plurality of inwardly-extending ribs, and wherein the plurality of outwardly-extending ribs interconnect with the plurality of inwardly-extending ribs, and remain interconnected as the mobile device is inserted into and removed from the case.

10. The case of claim 1, wherein the upper assembly body supports a plurality of actuatable components configured to transfer pressure to a device placed within the inner cavity.

11. The case of claim 1, wherein the bottom assembly comprises an outer bottom assembly portion made of a first material and an inner bottom assembly portion attached to the outer bottom assembly portion and made of a second material, wherein the second material is softer than the first material.

12. The case of claim 11, wherein the inner bottom assembly portion comprises latticework configured to provide air pockets for improved heat transfer away from a back surface of the mobile device.

13. A substantially rectangular case having a length between an upper wall and a lower wall, a width between a first sidewall and a second sidewall, and a depth between a front surface and a rear surface, the case comprising:
    a flat membrane forming at least a first portion of the front surface and existing in a first plane, the membrane having four edges forming a membrane perimeter;
    an upper assembly body at least partially surrounding the membrane perimeter and extending in a perpendicular direction away from the first plane to form at least the first and second sidewalls; and
    a bottom assembly forming the rear surface and extending parallel to the membrane, the bottom assembly removably attachable to the upper assembly body to form an internal cavity;
    wherein the front surface of the case is completely flat across the width of the case at a point midway between the upper wall and the lower wall; and
    wherein the upper assembly body comprises an outer cushion and a plurality of flexible doors that seal against each other and combine with the cushion to completely surround an outer surface of the upper wall, the lower wall, and the first and second sidewalls.

14. The case of claim 13, wherein the plurality of flexible doors are movable between closed positions in which the internal cavity is watertight and open positions in which access is provided for electrical wires to enter the internal cavity.

15. The case of claim 13, wherein the front surface of the case is completely flat at all points.

* * * * *

UNITED STATES PATENT AND TRADEMARK OFFICE
CERTIFICATE OF CORRECTION

PATENT NO.       : 9,223,346 B2
APPLICATION NO.  : 14/470798
DATED            : December 29, 2015
INVENTOR(S)      : Scott H. Wilson Page 1 of 1

It is certified that error appears in the above-identified patent and that said Letters Patent is hereby corrected as shown below:

Column 13, line 31, Claim 1; "assembly body" should be changed to --the upper assembly body--.

Signed and Sealed this
Nineteenth Day of July, 2016

Michelle K. Lee
*Director of the United States Patent and Trademark Office*